(12) United States Patent
Flook et al.

(10) Patent No.: US 9,574,024 B1
(45) Date of Patent: *Feb. 21, 2017

(54) METHOD OF MAKING A FUNCTIONALIZED ELASTOMER VIA ALLYLBORATION

(71) Applicant: The Goodyear Tire & Rubber Company, Akron, OH (US)

(72) Inventors: Margaret McGuigan Flook, Kent, OH (US); Inigo Gottker genannt Schnetmann, Constance (DE); Hannes Leicht, Constance (DE); Stefan Mecking, Constance (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,593

(22) Filed: Jul. 12, 2016

(51) Int. Cl.
  *C08K 5/07* (2006.01)
  *C08F 2/00* (2006.01)
  (Continued)

(52) U.S. Cl.
  CPC ...................................... *C08F 8/28* (2013.01)

(58) Field of Classification Search
  CPC .................................................. C08F 236/06
  (Continued)

(56) References Cited

U.S. PATENT DOCUMENTS 4,386,185 A    5/1983    Macdonell et al.
6,245,862 B1    6/2001    Rajagopalan
(Continued)

*Primary Examiner* — William Cheung
(74) *Attorney, Agent, or Firm* — John D. DeLong

(57) ABSTRACT

The present invention is directed to a method of making a functionalized elastomer, comprising the steps of: forming a copolymer Y by copolymerizing a first monomer and a second monomer, wherein the first monomer is selected from the group consisting of 1,3-butadiene, isoprene, and styrene; the second monomer is selected from the group consisting of formula 1 or 2

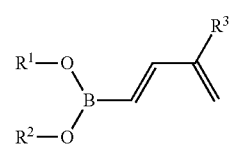

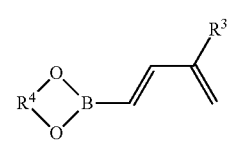

wherein B is boron; O is oxygen; $R^1$ and $R^2$ are independently linear or branched alkyl groups containing 1 to 10 carbon atoms; $R^3$ is hydrogen or a linear or branched alkyl group containing 1 to 10 carbon atoms; and $R^4$ is a linear or branched alkane diyl group containing 1 to 20 carbon atoms, or a bridging aromatic group; and reacting the copolymer Y with a compound Z to form the functionalized elastomer, wherein Z is a compound of formula 3

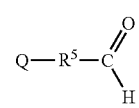

where $R^5$ is phenylene, a linear or branched alkane diyl group containing from 1 to 10 carbon atoms, or a combination of one or more phenylene groups and one or more (Continued)

linear or branched alkane diyl groups containing from 1 to 10 carbon atoms; and Q is hydrogen, bromine, or a functional group comprising at least one heteroatom selected from the group consisting of nitrogen, oxygen, phosphorus, silicon, and sulfur.

13 Claims, 1 Drawing Sheet

(51) Int. Cl.
    *C08F 36/00*     (2006.01)
    *C08F 12/02*     (2006.01)
    *C08F 8/28*     (2006.01)

(58) Field of Classification Search
    USPC .......................... 525/154; 526/89, 335, 346
    See application file for complete search history.

(56) References Cited

U.S. PATENT DOCUMENTS

| | | |
|---|---|---|
| 6,933,358 B2 | 8/2005 | Halasa et al. |
| 7,476,700 B2 | 1/2009 | Mutin |
| 7,906,593 B2 | 3/2011 | Halasa et al. |
| 8,513,452 B1 * | 8/2013 | Antilla .............. C07F 9/657154 |
| | | 558/73 |
| 9,238,765 B2 | 1/2016 | Corona Galvan et al. |
| 2003/0130535 A1 | 7/2003 | Deschler et al. |

\* cited by examiner

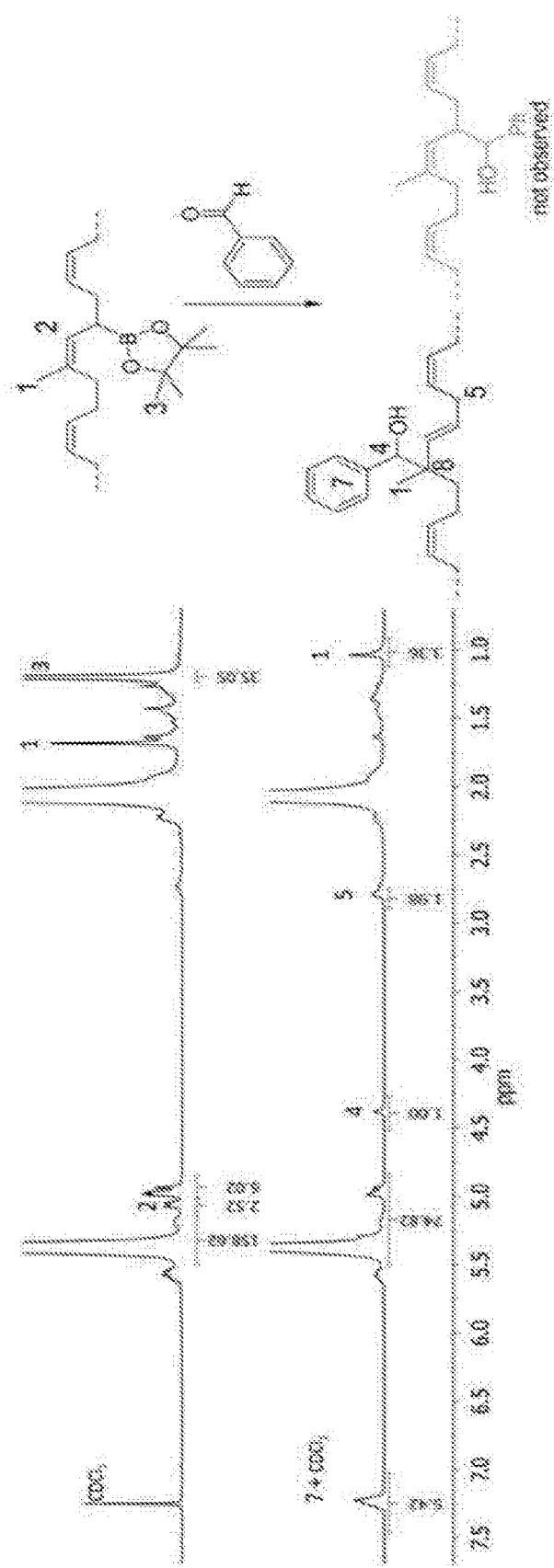

METHOD OF MAKING A FUNCTIONALIZED ELASTOMER VIA ALLYLBORATION

BACKGROUND

Stereoregular diene polymers are produced and used industrially on a large scale as an important component of tire compounds. Diene polymers with high levels of stereoregularity are almost exclusively prepared with coordination polymerization catalysts, which are in general easily poisoned by polar functionalities. Because of this poisoning effect, the types of monomers that are compatible with coordination catalysts are usually limited to simple hydrocarbons. It is well known within the tire industry that the incorporation of even low levels of functionality into certain tire polymers (prepared through anionic or emulsion polymerization) significantly improves the performance of tires containing such polymers. Unfortunately, there is currently no reliable method to apply this functionalization technology to stereoregular diene polymers, but it is likely that such a polymer would show superior tire properties over known unfunctionalized polymers.

The synthesis of copolymers based on polar and nonpolar olefins via insertion polymerization is a challenging goal of polymer chemistry. Fundamental progress has been made recently in the polymerization of ethylene with polar vinyl monomers (see e.g., Chen, Chem. Rev. 2009, 109, 5157-5214; Drent et al., Chem. Commun. 2002, 744-745; Johnson et al., J. Am. Chem. Soc. 1996, 118, 267-268; Nakamura et al., Chem. Rev. 2009, 109, 5215-5244.) The functionalization of poly(dienes) via direct copolymerization with polar monomers, however, is almost exclusively accomplished by free-radical or anionic methods (see e.g., Sheares et al., J. Polym. Sci., Part A: Polym. Chem. 2000, 38, 4070-4080; Sunada et al., J. Appl. Polym. Sci. 2005, 97, 1545-1552; Yang et al., Macromolecules 2006, 39, 8625-8631; Yang et al., Polymer 2007, 48, 105-109.) The lack of microstructure control in these polymerizations is a major drawback because the properties of the poly(dienes), and hence the applicability, are strongly dependent on the polymer microstructure. Post polymerization functionalization is widely applied in polydiene chemistry. Vulcanization in the rubber industry is a prominent example. The reactivity of sulfur compounds with double bonds was also applied in the functionalization of 1,2-polybutadiene and poly(isoprene-co-3methylenehepta-1,6-diene) via the thiol-ene reaction (see e.g., David et al., Macromolecules 2008, 41, 1151-1161; Justynska et al., Polymer 2005, 46, 12057-12064; Li et al., Macromolecules 2016; Brummelhuis, et al, Macromolecules 2008, 41, 9946-9947.) Although the functionalizations were successful, they still require additional activation, namely UV-irradiation and/or the addition of radical initiators. However, this approach cannot be utilized for high 1,4-cis poly(butadiene) (PBD) as cross-linking occurs under the functionalization conditions. A mild method for a versatile post polymerization functionalization of 1,4-cis-poly(butadiene) with a reactivity approach orthogonal to the backbone's double bonds is highly desirable.

SUMMARY

The present invention is directed to a method of making a functionalized elastomer, comprising the steps of:

forming a copolymer Y by copolymerizing a first monomer and a second monomer, wherein the first monomer is selected from the group consisting of 1,3-butadiene, isoprene, and styrene; the second monomer is selected from the group consisting of formula 1 or 2

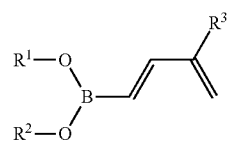

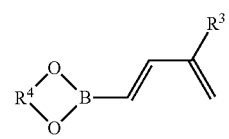

wherein B is boron; O is oxygen; $R^1$ and $R^2$ are independently linear or branched alkyl groups containing 1 to 10 carbon atoms; $R^3$ is hydrogen or a linear or branched alkyl group containing 1 to 10 carbon atoms; and $R^4$ is a linear or branched alkane diyl group containing 1 to 20 carbon atoms, or a bridging aromatic group; and reacting the copolymer Y with a compound Z to form the functionalized elastomer, wherein Z is a compound of formula 3

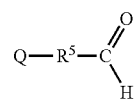

where $R^5$ is phenylene, a linear or branched alkane diyl group containing from 1 to 10 carbon atoms, or a combination of one or more phenylene groups and one or more linear or branched alkane diyl groups containing from 1 to 10 carbon atoms; and Q is hydrogen, bromine, or a functional group comprising at least one heteroatom selected from the group consisting of nitrogen, oxygen, phosphorus, silicon, and sulfur.

BRIEF DESCRIPTION OF THE DRAWING

FIG. 1 shows $^1$H NMR spectra of a copolymer before and after an allylboration reaction with benzaldehyde.

DESCRIPTION

There is disclosed a method of making a functionalized elastomer, comprising the steps of:

forming a copolymer Y by copolymerizing a first monomer and a second monomer, wherein the first monomer is selected from the group consisting of 1,3-butadiene, isoprene, and styrene; the second monomer is selected from the group consisting of formula 1 or 2

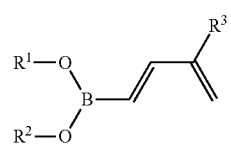

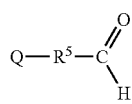

wherein B is boron; O is oxygen; $R^1$ and $R^2$ are independently linear or branched alkyl groups containing 1 to 10 carbon atoms; $R^3$ is hydrogen or a linear or branched alkyl group containing 1 to 10 carbon atoms; and $R^4$ is a linear or branched alkane diyl group containing 1 to 20 carbon atoms, or a bridging aromatic group; and reacting the copolymer Y with a compound Z to form the functionalized elastomer, wherein Z is a compound of formula 3

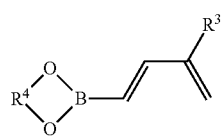

where $R^5$ is phenylene, a linear or branched alkane diyl group containing from 1 to 10 carbon atoms, or a combination of one or more phenylene groups and one or more linear or branched alkane diyl groups containing from 1 to 10 carbon atoms; and Q is hydrogen, bromine, or a functional group comprising at least one heteroatom selected from the group consisting of nitrogen, oxygen, phosphorus, silicon, and sulfur.

The copolymer Y is produced via polymerization of a first, non-functionalized diene monomer and a second, functionalized diene monomer.

In one embodiment, the non-functionalized diene monomer or first monomer is 1,3-butadiene, isoprene, or styrene. In one embodiment, the first monomer is 1,3-butadiene or isoprene.

In one embodiment, the functionalized diene monomer or second monomer is selected from the group consisting of formula 1 and 2

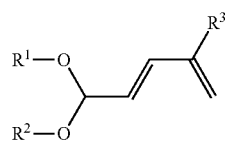

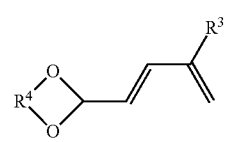

wherein B is boron; O is oxygen; $R^1$ and $R^2$ are independently linear or branched alkyl groups containing 1 to 10 carbon atoms; $R^3$ is hydrogen or a linear or branched alkyl group containing 1 to 10 carbon atoms; and $R^4$ is a linear or branched alkane diyl group containing 1 to 20 carbon atoms, or a bridging aromatic group.

In one embodiment, $R^4$ is a bridging aromatic group selected from one of the following structures:

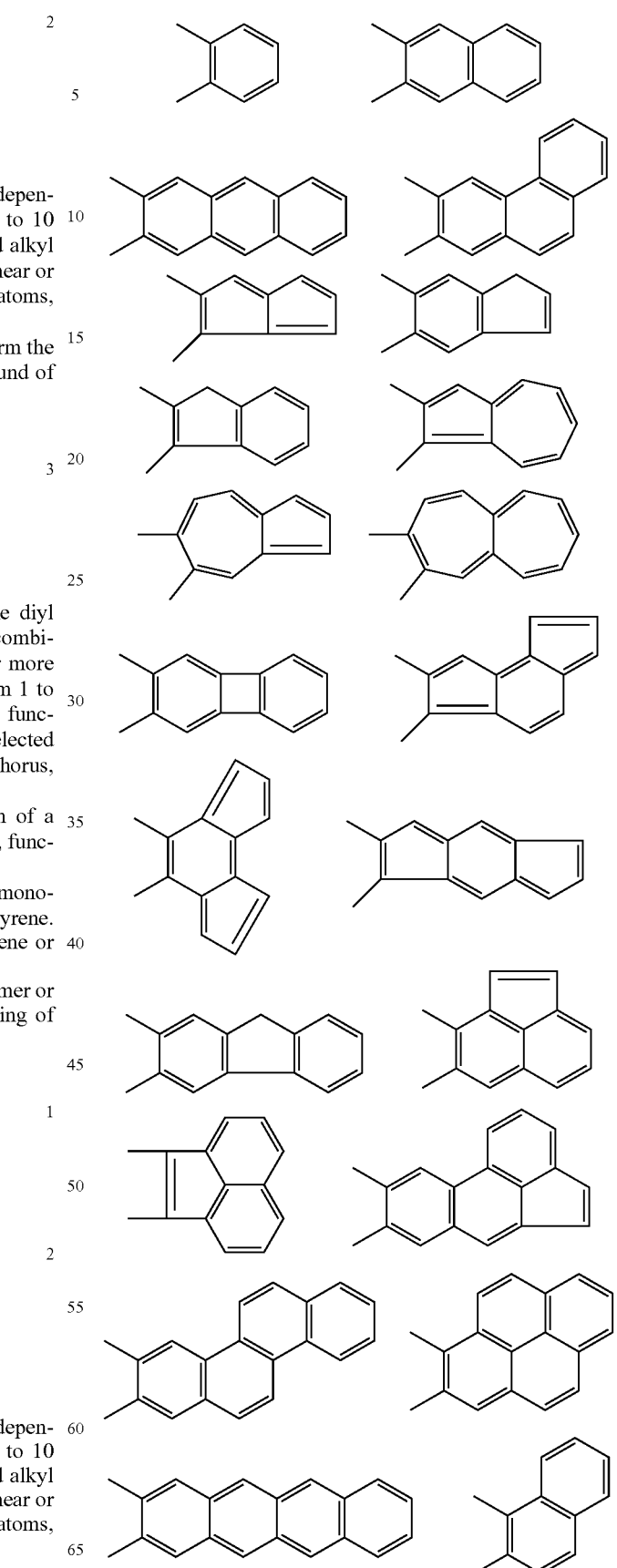

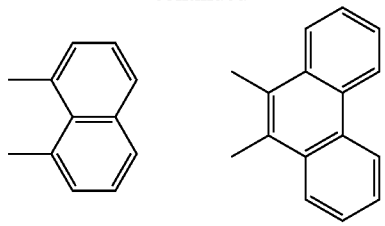

The copolymer is produced by polymerization of the non-functionalized monomer and functionalized monomer in the presence of a nickel coordination catalyst. In one embodiment, the catalyst is an (allyl)(arene)Ni(II) compound. Suitable (allyl)(arene)Ni(II) compounds may be produced as described in O'Connor et al. (*Organometallics* 2009, 28 2372-2384). The catalyst is generally in the form of a cation with a suitable counteranion. In one embodiment, the counteranion is tetrakis(3,5-bis(trifluoromethyl)phenyl) borate (i.e. $BAr^F_4{}^-$). In one embodiment, the catalyst is the (allyl)(mesitylene)Ni(II)$^+$ $BAr^F_4{}^-$ complex as shown in formula 10

10

The polymerization using the (allyl)(arene)Ni(II) catalysts may be done following the methods as described in O'Connor et al. (*Journal of Applied Polymer Science, Part A: Polymer Chemistry*, Vol. 48, 1901-1912 (2010)). The copolymerization may be carried out by solution polymerization at a temperature ranging from 0 to 60° C. Suitable solvents for the solution polymerization include toluene, methylene chloride, and heptane, and the like.

To produce the functionalized elastomer, the copolymer Y is reacted in an allylboration reaction with an aldehyde substituted with a desirable functional group. The following scheme depicts allylboration of the copolymer Y with an aldehyde substituted with a group R:

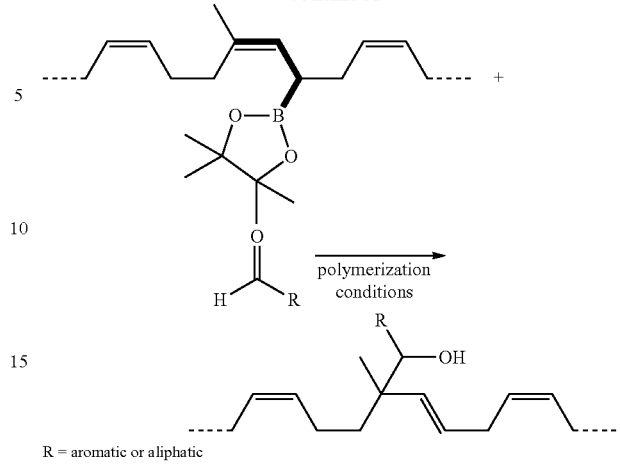

R = aromatic or aliphatic

In one embodiment, the copolymer Y is reacted in an allylboration reaction with a compound Z of formula 3

3 where $R^5$ is phenylene, a linear or branched alkane diyl group containing from 1 to 10 carbon atoms, or a combination of one or more phenylene groups and one or more linear or branched alkane diyl groups containing from 1 to 10 carbon atoms; and Q is hydrogen, bromine, or a functional group comprising at least one heteroatom selected from the group consisting of nitrogen, oxygen, phosphorus, silicon, and sulfur.

In one embodiment, Q comprises at least one functional group selected from the group consisting of hydroxyl, carboxyl, carboxylate, alkoxy, carboxamido, primary amino, secondary amino, ammonio, imino, imido, azido, azo, cyanato, isocyanato, nitroxy, cyano, isocyano, nitrosooxy, nitro, nitroso, oxime, pyridinyl, bipyridinyl, terpyridinyl, sulfanyl, thio, sulfide, disulfide, sulfoxide, sulfone, sulfinic acid, sulfonic acid, thiocyanate, isothiocyanate, thione, thial, phosphane, phosphonic acid, phosphate, phophodiester, silyl, alklysilyl, alkoxysilyl, siloxy, and halogen.

In one embodiment, Q is a functional group of formula 4

4 wherein N is nitrogen, $R^6$ and $R^7$ are independently hydrogen, phenyl, or a linear or branched alkyl group containing 1 to 10 carbon atoms, or $R^6$ and $R^7$ taken together with the nitrogen atom represent a nitrogen containing heterocyclic group containing from 4 to 12 carbon atoms.

In one embodiment, the nitrogen containing heterocyclic group in formula 4 is selected from

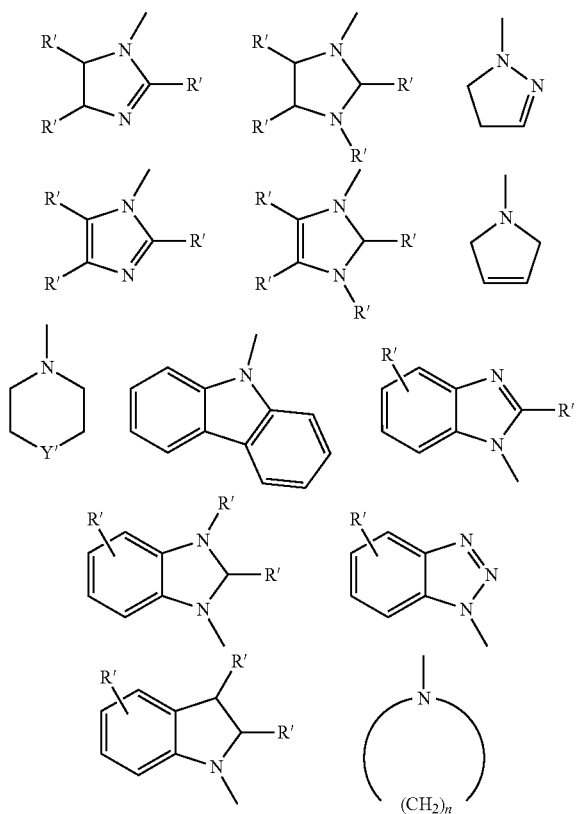

wherein R' groups can be the same or different and represent a member selected from the group consisting of linear or branched alkyl groups containing from 1 to about 10 carbon atoms, aryl groups, allyl groups, and alkoxy groups, and wherein Y' represents oxygen, sulfur, or a methylene group, and n is an integer from 4 to 12.

In one embodiment, Q is a functional group of formula 5 or 6

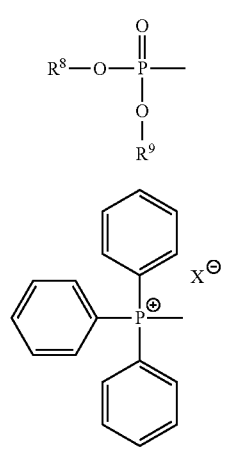

where P is phosphorus, O is oxygen, $R^8$, $R^9$ are independently C1 to C8 linear or branched alkyl, and X is halogen.

The allylboration reaction between the copolymer Y and compound Z may be performed using the isolated copolymer Y, or immediately subsequent to the copolymerization of the first and second monomers using the existing polymerization medium and conditions. Suitable polymerization and allylboration conditions are illustrated in the attached examples.

The copolymer Y and the subsequent functionalized elastomer each have a high degree of stereoregularity. In one embodiment, the copolymer has a cis 1,4 microstructure content of greater than 80 percent by weight based on the polybutadiene or isoprene content of the copolymer. In one embodiment, the copolymer has a cis 1,4 microstructure content of greater than 95 percent by weight based on the polybutadiene or isoprene content of the copolymer.

The copolymer Y and the subsequent functionalized elastomer each have a major weight portion attributed to units derived from the non-functionalized first monomer, and a minor weight portion attributed to units derived from the functionalized second monomer. In one embodiment, the copolymer comprises from 0.1 to 40 percent by weight of units derived from the functionalized diene monomer (second monomer). In one embodiment, the copolymer comprises from 0.5 to 20 percent by weight of units derived from the functionalized diene monomer (second monomer). In one embodiment, the copolymer comprises from 1 to 5 percent by weight of units derived from the functionalized diene monomer (second monomer).

The functionalized elastomer may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

The invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Synthesis of the Ni catalyst of formula 10 is described in literature (O'Connor et al. *Organometallics* 2009, 28 2372-2384). Alternatively, a mixture of this complex with Mg-salts and excess $NaBAr^F_4$ can be generated by following the outlined procedure of example 2.

Example 2

In this example, the synthesis of a Ni(II) coordination catalyst is illustrated. The compound of formula 11 was converted to the compound of formula 10 as follows. Compound 11 (8 mmol) was combined with $NaBAr^F_4$ (8 mmol) and mesitylene (20 mmol) in 40 ml of diethyl ether in a 100 ml Schlenk tube and cooled −78° C. After 5 minutes, 8 ml of 1 M allyl magnesium bromide in diethyl ether was dropwise added under stiffing, and the temperature increased to −20° C. by exchange of the cooling bath after the addition of allyl magnesium bromide was complete. After 60 minutes at −20° C., the cooling bath was removed and the mixture warmed to 25 C at which the ether was distilled off at 25° C. to leave a crude solid. Methylene chloride (30 ml) was then added and the mixture was agitated, followed by filtration of the solids. Heptane (10 mL) was added to the methylene chloride solution and the resulting mixture concentrated to dryness under high vacuum to leave 6.85 g of solids containing about 50% yield of the catalyst 10 based on Ni.

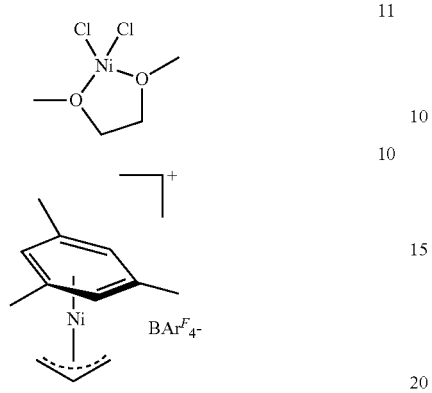

Example 3

In the following example, the copolymerization of 1,3 butadiene with (E)-4,4,5,5-tetramethyl-2-(3-methylbuta-1,3-dien-1-yl)-1,3,2-dioxaborolane (formula 7) is illustrated.

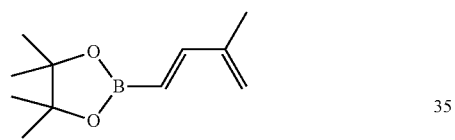

(E)-4,4,5,5-tetramethyl-2-(3-methylbuta-1,3-dien-1-yl)-1,3,2-dioxaborolane

The functional monomer (E)-4,4,5,5-tetramethyl-2-(3-methylbuta-1,3-dien-1-yl)-1,3,2-dioxaborolane may be synthesized following methods as described in Chemistry—A European Journal (2013), 19, (28), 9127-9131. Alternatively, (E)-4,4,5,5-tetramethyl-2-(3-methylbuta-1,3-dien-1-yl)-1,3,2-dioxaborolane can be synthesized in optimized yield by the following procedure.

Synthesis of 2-methylbut-1-en-3-yne

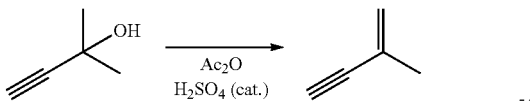

According to Defranq, E.; Zesiger, T.; Tabacchi, R. *Helv. Chim. Acta* 1993, 76, 425-430: 215 g 2-methyl-3-yn-2-ol (2.5 mol, 1 equiv.) were filled into a 1 L three-necked flask, equipped with a dropping funnel and a distillation apparatus. The receiver flask was cooled to −78° C. 319 g acetic anhydride (3.13 mol, 1.25 equiv.) and 12 g sulfuric acid (0.12 mol, 0.05 equiv.) were filled into the dropping funnel and added dropwise over 2 hours starting at 50° C. After addition of 50 mL the temperature was increased to 70° C. and distillation of the product began (bp.: 33° C./1 atm). After complete addition the temperature was increased to 80° C. The product was washed with ice water to remove residues of acetic acid and alcohol and dried with sodium sulfate.

Yield: 55% (90 g, 1.36 mol, related to 2-methyl-3-yn-2-ol), clear liquid

$^1$H NMR (400 MHz, 25° C., CDCl$_3$): δ 5.38 (m, 1H, H-3), 5.29 (m, 1H, H-3), 2.86 (s, 1H, H-2), 1.90 (t, $^4J_{1-3}$=1.3 Hz, 3H, H-1).

Synthesis of (E)-4,4,5,5-tetramethyl-2-(3-methylbuta-1,3-dien-1-yl)-1,3,2-dioxaborolane

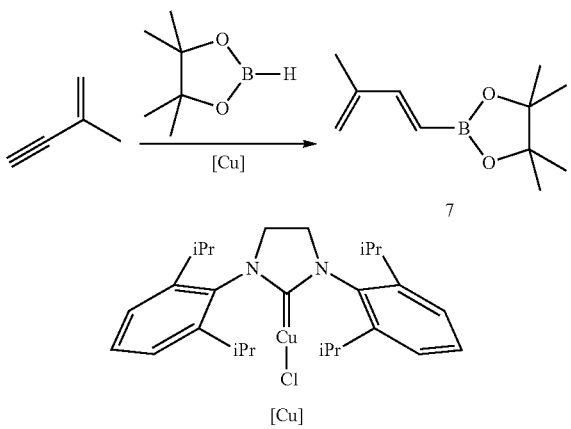

In analogy to a procedure published by Hoveyda et al. hydroborylation of 2-methylbut-1-en-3-yne was accomplished under copper catalysis (Lee, Y; fang, H.; Hoveyda, A. H. *J. Am. Chem. Soc.* 2009, 131, 18234-18235): 3.8 g (30 mmol, 1 equiv.) pinacolborane, 2.2 g 2-methylbut-1-en-3-yne (33 mmol, 1.1 equiv), 4 mg (10 μmol, 0.3 mol %) 1,3-(2,6-di-isopropyl-phenyl)imidazolidin-2-ylidene)copper (I) chloride and 8 mg (13 μmol, 0.4 mol %) lithium tert-butoxide were stirred under exclusion of water and oxygen for 2 days. The volatiles were removed in vacuum and the residue purified via bulb to bulb distillation.

Yield: quantitative

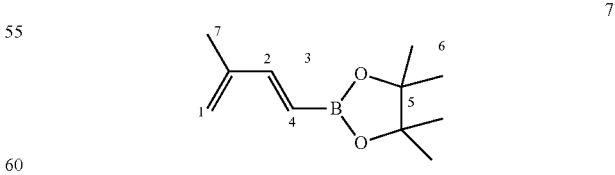

$^1$H NMR (400 MHz, 25° C., C$_6$D$_6$): δ=7.47 (d, $^3J_{4-3}$=18 Hz, 1H, H4), 5.82 (dt, $^3J_{3-4}$=18 Hz, $^4J_{3-1}$=0.5 Hz, 1H, H3), 4.90-5.05 (m, 2H, H1), 1.68 (m, 3H, H7), 1.09 (m, 12H, H6)

$^{13}$C NMR (400 MHz, 25° C., C$_6$D$_6$): δ=152.7 (C3), 143.4 (C2), 120.0 (C1), 117.2 (b, C4), 83.1 (C5), 24.9 (C6), 17.7 (C7).

Example 4

In this example, the copolymerization of 1,3 butadiene with the monomer of formula 7 is illustrated. Polymerizations were done to produce four copolymer samples, as indicated in Table 1.

The functional monomer of formula 7 was synthesized as described in Example 3.

The monomer of formula 7 was added to a flame-dried schlenk-flask as toluene solution (total volume of toluene 15 mL for sample 1-3, and 35 mL for sample 4) and the flask was subsequently sealed with a rubber septum. Butadiene was added, either by condensation into the toluene at −78° C. (samples 1-3) or by saturation of the toluene at the reaction temperature (sample 4). The polymerization was initiated by adding the catalyst of formula 10 in toluene (5 mL) at the indicated reaction temperature. The polymerization was allowed to run at that temperature for the indicated time. 0.5 mL of $NEt_3$ were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-(E)-4,4,5,5-tetramethyl-2-(3-methylbuta-1,3-dien-1-yl)-1,3,2-dioxaborolane). Samples were analyzed with results given in Table 1. Molecular weight Mn and polydispersity (PDI) were measured using GPC in THF vs. polystyrene standards. Glass transition temperature Tg was measured using DSC. The microstructure of the polymer was determined by NMR-analyses ($^1H$ and $^{13}C$).

| Sample No. | 1 | 2 | 3 | 4 |
|---|---|---|---|---|
| amount of catalyst[1], μmol | 10 + 10 | 10 | 10 + 15 | 6 |
| temperature, ° C. | 0 | r.t. | r.t. | 0 |
| time, hr | 1 | 1 | 5.5 | 4 |
| butadiene, g | 9.1 | 10.3 | 9.0 | 1.05 Bar |
| comonomer of formula IV, mmol | 0.52 | 2.06 | 5.18 | 0.43 |
| yield, g | 5.7 | 4.9 | 7.7 | 13.2 |
| comonomer incorporation, mol % | 0.43 | 1.85 | 3.6 | 0.175 |
| comonomer conversion, % | 87 | 81 | 99 | 99 |
| $M_n$, $10^3$ g/mol | 65 | 37 | 25 | 140 |
| PDI | 2.6 | 2.4 | 2 | 1.9 |
| $T_g$, ° C. | −97 | −95 | −92 | −96 |
| Microstructure, % 1,4 cis | 96 | 96 | 95 | 96 |

[1]Catalyst was added in two aliquots in samples 1 and 3 as indicated

Example 5

In this example, allylboration with a model compound is illustrated.

Initial experiments with allylboronic acid pinacol ester as model compounds were designed to investigate the behavior of the reaction under conditions comparable to those of the desired application. All model reactions with allylboronic acid pinacol ester and different aldehydes (pentanal, benzaldehyde, p-NO2-benzaldehyde, p-dimethylaminobenzaldehyde, and 4-(1-pyrrolidinyl)benzaldehyde) showed the allylboration reaction to be a potentially robust and easy method for the introduction of functional groups into the backbone of poly(dienes). The expected products were formed in good (e.g. 73% with p-dimethylaminobenzaldehyde) to high yields (e.g. 89% with p-NO2-benzaldehyde) as observed by means of $^1H$ NMR.

Example 6

In this example, allylboration using the copolymer and various aldehydes is illustrated.

To assess the general reactivity of aldehydes towards the allyl boronic acid ester groups in the polymer backbone, 500 mg copolymer (made and isolated using the procedures of Example 4) were reacted with 10 equiv. benzaldehyde (60° C., 3 days in 5 mL toluene). The excess of benzaldehyde was removed subsequent to the reaction by precipitation of the polymer in methanol. After drying under reduced pressure, the polymer was characterized comprehensively by NMR spectroscopy.

The full conversion of the allylboronic acid pinacol ester groups in the copolymer to the desired secondary alcohol is evident by comparing key signals in the copolymer before and after the allylboration reaction (FIG. 1). With reference to FIG. 1, while the signals for the vinylic $CH_3$ group 1, the olefinic proton 2, and the $CH_3$ groups of the pinacol ester 3 disappear, a set of new key resonances can be found in the product. These key resonances include the OH-substituted CH group 4 with a distinctive shift in $^1H$ (4.38 ppm) as well as $^{13}C$ NMR (80.8 ppm). In addition, a signal for the newly formed biallylic $CH_2$ group 5 resonates at δ=2.79 ppm ($^{13}C$: 30.8 ppm), the peak of $CH_3$ group 1 shifts from 1.69 ppm to 1.04 ppm, and signals of aromatic protons of aryl ring 7 appear between 7.15 and 7.32 ppm. These observations and the chemical shift of quaternary carbon atom 8 (44.5 ppm) prove the nucleophilic substitution to proceed highly selective in an SN2' fashion. Signals indicating the formation of the product formed in a substitution following an SN2 mechanism or other side-reactions were not observed.

To enlarge the scope of this functionalization approach, further different aldehydes were reacted with the copolymer: The full conversion of the allylboronic acid pinacol ester groups of the copolymer with pentanal under otherwise identical conditions showed that the reactivity is not limited to aromatic aldehydes but also alkyl aldehydes are suitable reagents for functionalization of diene copolymers via an allylboration reaction. Quantitative conversions are also observed when commercially available, N-functionalized, aromatic aldehydes are used. Both, 4-(1-pyrrolidinyl)benzaldehyde and p-dimethylaminobenzaldehyde were individually reacted for two days with the copolymer under otherwise identical conditions as the reaction with benzaldehyde. NMR analyses after repeated precipitation of the polymers showed in both cases additional signals compared to polymer functionalized with benzaldehyde: The polymer functionalized with 4-(1-pyrrolidinyl)benzaldehyde exhibits both $^1H$ and $^{13}C$ signals for the pyrrolidine moiety at δ=3.28 ppm (47.7 ppm) and 2.00 ppm (25.6 ppm). In the case of p-dimethylaminobenzaldehyde, both methyl groups resonate at 2.94 ppm as a key signal in the proton NMR spectrum.

Example 7

The procedures of Example 6 were all conducted with separately synthesized and isolated copolymer. However, a functionalization is desirable without an additional step (i.e. work-up of the polymer) directly after the copolymerization of butadiene with [(4,4,5,5-tetramethyl-2-(3-methyl-1,3butadienyl)-1,3,2-dioxaborolane]. For this purpose, we ran two copolymerizations under standard polymerization conditions (20 μmol catalyst of formula 10, 20 mL toluene, 1.05 bar butadiene, 0.7-0.8 mmol comonomer, 25° C., 30 min.) At the end of both polymerizations excess butadiene was removed under reduced pressure and benzaldehyde (42 equiv to comonomer) or 4-(1-pyrrolidinyl)benzaldehyde (10 equiv. to comonomer) was added. Both reaction mixtures were then stirred at 50° C. and the conversion was followed by $^1$H NMR taking aliquots. The reaction with benzaldehyde showed a degree of functionalization of ca. 50% after min and complete functionalization after two hours. The reaction using 4-(1pyrrolidinyl)benzaldehyde, however, proceeded significantly slower. After 2.5 h only 25% of the allylboronic acid ester groups in the copolymer were converted. A conversion of 50% was reached after 28 h and full functionalization was reached after two days. This difference in reaction rates is possibly due the different amounts of aldehyde compared to comonomer, or to a deactivating influence of the amine group in para-position to the aldehyde moiety.

Example 8

The results of Example 7 prompted us to engage in the synthesis of aromatic aldehydes with a methylene group as spacer between the aromatic ring and the functional group. Additionally, this approach should generate a platform to synthesize aromatic amines with different functional groups.

Syntheses of differently functionalized aromatic aldehydes were accomplished via two different routes (Scheme 1).

cation of well-known protecting group chemistry enables the successful synthesis of the desired product. Except for the first step, the synthesis of 4(bromomethyl)benzaldehyde, no further purification was necessary for the obtained products. The various functionalized aldehydes produced are shown in Table 1.

TABLE 1

| A1 | 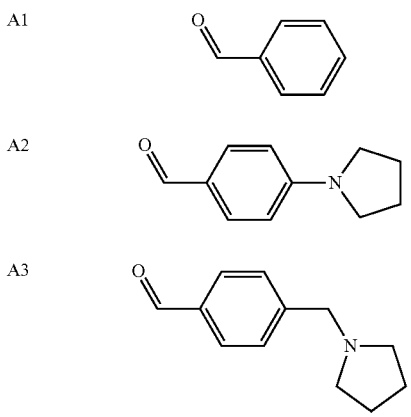 |
|---|---|
| A2 | |
| A3 | |

Scheme 1.

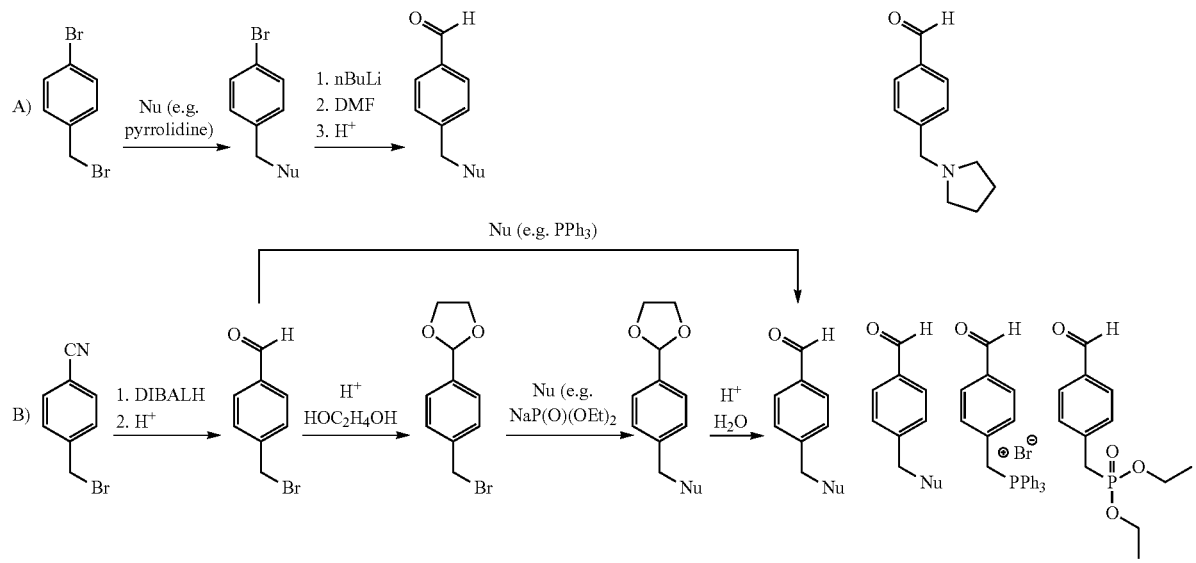

Route A) encompasses the functionalization of 1-bromo-4 (bromomethyl)benzene with a nucleophile (e.g. pyrrolidine) followed by the conversion to the desired aromatic aldehyde by reaction with n-BuLi and DMF followed by acidic aqueous work-up. Both steps give the desired product in high yields and purity, making purification steps like distillation or column chromatography unnecessary. However, not all functional groups that can be introduced this way are stable towards the conditions in the second step. Therefore, we also used a second route to synthesize functionalized aromatic aldehydes. Route B) starts with the synthesis of 4(bromomethyl)benzaldehyde which can be directly reacted with a nucleophile (e.g. PPh$_3$). If the nucleophile is reactive towards the aldehyde group (e.g. NaP(O)(OEt)$_2$), the appli- TABLE 1-continued

| A4 | 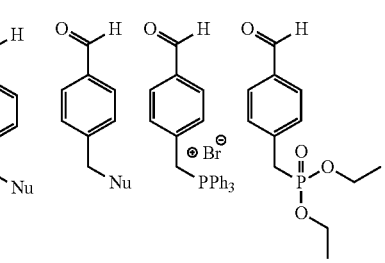 |
|---|---|
| A5 | 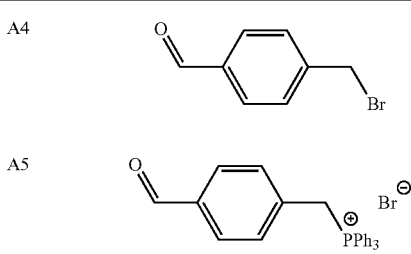 |

TABLE 1-continued

| | |
|---|---|
| A6 | 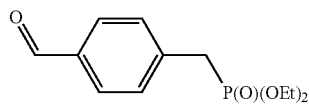 |

Example 9

To gain more information about the reaction's actual progress over time influenced by the para-substituents, we followed the reaction of the copolymer with benzaldehyde, 4-(1-pyrrolidinyl)benzaldehyde, and 4-(pyrrolidinylmethyl)benzaldehyde by $^1$H NMR (12 equiv. of aldehyde to comonomer units, 60° C., table 2 entries 1, 2, and 3). The reactivity differences of the compared aldehydes are significant: The conversion with benzaldehyde reached 60% after 10 min and full conversion after 75 min (table 2, entry 1). In comparison, the reaction with 4-(1-pyrrolidinyl)benzaldehyde is much slower as 38% conversion is reached after 235 min and full conversion requires heating overnight (table 2, entry 2).

TABLE 2

| Sample No. | Aldehyde type* | equiv.$^{a)}$ | conversion, % | time $^{b)}$ |
|---|---|---|---|---|
| 1 | A1 | 12 | 99 | 75 min |
| 2 | A2 | 12 | 38 | 235 min |
|  |  |  | 99 | 21 h |
| 3 | A3 | 12 | 99 | 95 min |
|  |  | 1 | 99 | 18.5 h |
| 4 | A4 | 1 | 99 | 18.75 h |
| 5 | A5 | 1 | 99 | 20.3 h |
| 6 | A6 | 0.7 | 70 | 22.5 h |
|  |  | 0.5$^{c)}$ | 99 | 2.3 h |

Reaction conditions: 65 mg polymer, 0.6 mL CDCl3, 60° C.
* from Table 1
a) equivalents of aldehyde compared to functional groups present in the polymer
b) conversion of the functional groups in the polymer, determined from 1H NMR spectra
c) additional 0.5 equiv. of aldehyde were added after 22.5 h, full conversion was observed after additional 2.3 h.

The reaction with 4-(pyrrolidinylmethyl)benzaldehyde is again significantly faster and proceeds with rates comparable to those observed for the allylboration reaction using benzaldehyde (full conversion after 95 min, table 2, entry 3).

The high reactivities of the synthesized functionalized aromatic aldehydes and the clean and selective formation of the desired target structure allows the use of equimolar or even submolar amounts of aldehyde (table 2, entries 3-6). Although longer reaction times are required for equimolar reactions, a waste of reagents is avoided. Allylboration reactions with all synthesized aromatic aldehydes were successfully performed and the obtained functionalized polymers were scrutinized by NMR-spectroscopy to prove the complete functionalization of the 1,4-cis-poly(butadiene). Interestingly, a polymer functionalized with 4-(bromomethyl)benzaldehyde can be used for further functionalizations using the present bromomethyl-moiety which reacts readily with nucleophiles such as pyrrolidine A reaction with NH$_3$ is also possible via this approach, generating a primary amine group in the polymer backbone.

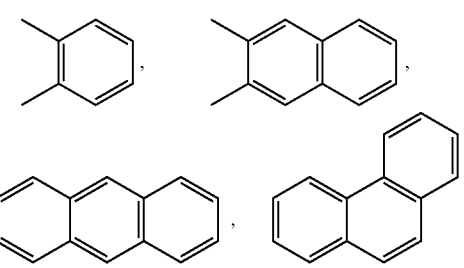

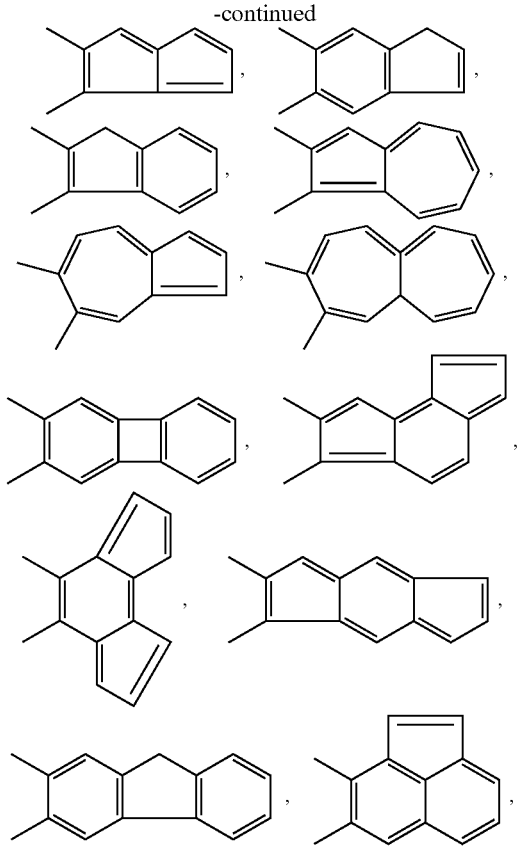
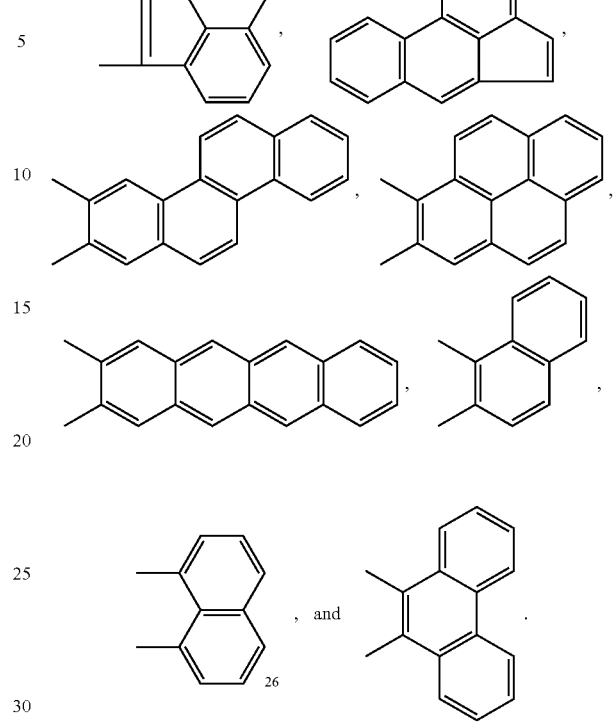

What is claimed is:

1. A method of making a functionalized elastomer, comprising the steps of:
forming a copolymer Y by copolymerizing a first monomer and a second monomer, wherein the first monomer is selected from the group consisting of 1,3-butadiene, isoprene, and styrene; the second monomer is selected from the group consisting of formula 1 or 2

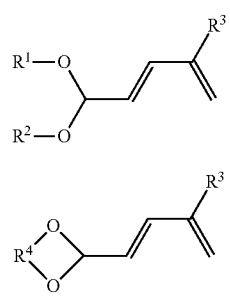

wherein B is boron; O is oxygen; $R^1$ and $R^2$ are independently linear or branched alkyl groups containing 1 to 10 carbon atoms; $R^3$ is hydrogen or a linear or branched alkyl group containing 1 to 10 carbon atoms; and $R^4$ is a linear or branched alkane diyl group containing 1 to 20 carbon atoms, or a bridging aromatic group; and
reacting the copolymer Y with a compound Z to form the functionalized elastomer, wherein Z is a compound of formula 3

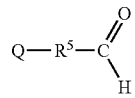

where $R^5$ is phenylene, a linear or branched alkane diyl group containing from 1 to 10 carbon atoms, or a combination of one or more phenylene groups and one or more linear or branched alkane diyl groups containing from 1 to 10 carbon atoms; and Q is hydrogen, bromine, or a functional group comprising at least one heteroatom selected from the group consisting of nitrogen, oxygen, phosphorus, silicon, and sulfur.

2. The method of claim 1, wherein the first monomer is isoprene or 1,3-butadiene.

3. The method of claim 1, where the second monomer has the structure

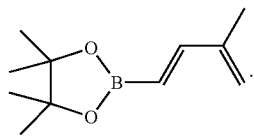

4. The method of claim 1, wherein the copolymerization is done in the presence of a nickel coordination catalyst.

5. The method of claim 4, wherein the catalyst is an (allyl)(arene)Ni(II) compound.

6. The method of claim 5 wherein the catalyst is of formula 10

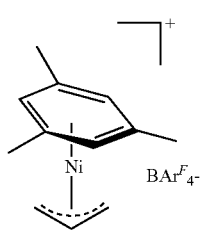

where BAr$^F_4{}^-$ is tetrakis(3,5-bis(trifluoromethyl)phenyl)borate.

7. The method of claim 1, wherein Q comprises at least one functional group selected from the group consisting of hydroxyl, carboxyl, carboxylate, alkoxy, carboxamido, primary amino, secondary amino, ammonio, imino, imido, azido, azo, cyanato, isocyanato, nitroxy, cyano, isocyano, nitrosooxy, nitro, nitroso, oxime, pyridinyl, bipyridinyl, terpyridinyl, sulfanyl, thio, sulfide, disulfide, sulfoxide, sulfone, sulfinic acid, sulfonic acid, thiocyanate, isothiocyanate, thione, thial, phosphane, phosphonic acid, phosphate, phophodiester, silyl, alklysilyl, alkoxysilyl, siloxy, and halogen.

8. The method of claim 1, wherein Q is a functional group of formula 4

wherein N is nitrogen, $R^6$ and $R^7$ are independently hydrogen, phenyl, or a linear or branched alkyl group containing 1 to 10 carbon atoms, or $R^6$ and $R^7$ taken together with the nitrogen atom represent a nitrogen containing heterocyclic group containing from 4 to 12 carbon atoms.

9. The method of claim 8, wherein the nitrogen containing heterocyclic group is selected from

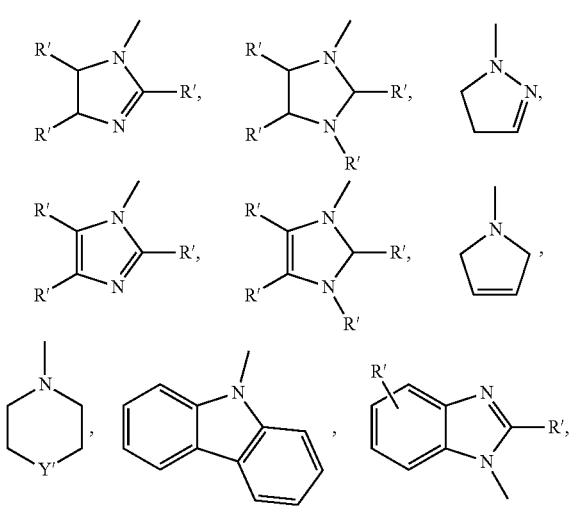

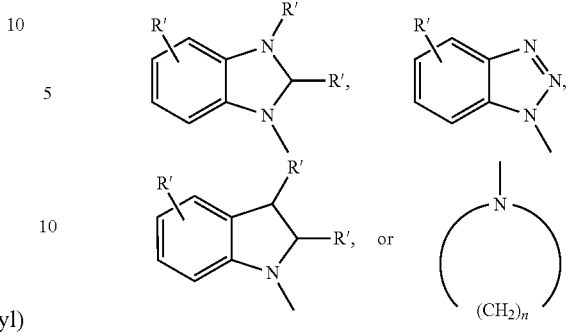

wherein R' groups can be the same or different and represent a member selected from the group consisting of linear or branched alkyl groups containing from 1 to about 10 carbon atoms, aryl groups, allyl groups, and alkoxy groups, and wherein Y' represents oxygen, sulfur, or a methylene group, and n is an integer from 4 to 12.

10. The method of claim 1, wherein Q is a functional group of formula 5 or 6

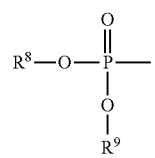

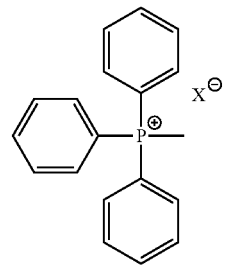

where P is phosphorus, O is oxygen, $R^8$, $R^9$ are independently C1 to C8 linear or branched alkyl, and X is halogen.

11. The method of claim 1, wherein Q is bromine and the method further comprises the step of reacting the functionalized elastomer with a nucleophile to produce a second functionalized elastomer.

12. The method of claim 11, wherein the nucleophile is pyrrolidine or $NH_3$.

13. The method of claim 1, wherein $R^4$ is a bridging aromatic group is selected from the group consisting of